(12) United States Patent
Sutherland et al.

(10) Patent No.: US 6,574,706 B2
(45) Date of Patent: Jun. 3, 2003

(54) MANAGING UNVIRTUALIZED DATA PAGES IN REAL STORAGE

(75) Inventors: Danny R. Sutherland, Poughkeepsie, NY (US); Elpida Tzortzatos, Lagrangeville, NY (US); Peter B. Yocom, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 09/795,425

(22) Filed: Feb. 28, 2001

(65) Prior Publication Data

US 2002/0120807 A1 Aug. 29, 2002

(51) Int. Cl.⁷ .............................................. G06F 12/08
(52) U.S. Cl. .................... 711/117; 711/156; 711/165; 711/203
(58) Field of Search ........................ 711/203, 112, 711/165, 156

(56) References Cited

U.S. PATENT DOCUMENTS

| | | | |
|---|---|---|---|
| 4,967,353 A | * 10/1990 | Brenner et al. | 711/160 |
| 5,095,420 A | * 3/1992 | Eilert et al. | 711/209 |
| 5,127,094 A | 6/1992 | Bono | 711/2 |
| 5,237,668 A | 8/1993 | Blandy et al. | 711/2 |
| 5,293,599 A | * 3/1994 | Kagimasa et al. | 711/159 |
| 5,394,539 A | 2/1995 | Neuhard et al. | 711/209 |
| 5,410,700 A | * 4/1995 | Fecteau et al. | 709/100 |
| 5,897,664 A | 4/1999 | Nesheim et al. | 711/206 |

FOREIGN PATENT DOCUMENTS

JP 2-37443 2/1990

\* cited by examiner

Primary Examiner—Do Hyun Yoo
Assistant Examiner—Kathy Takeguchi
(74) Attorney, Agent, or Firm—Scully, Scott, Murphy & Presser; William A. Kinnaman, Jr.

(57) ABSTRACT

In a computing system implementing a virtual memory system having real memory storage frames for storing virtual pages of data and an auxiliary storage system comprising auxiliary storage slots for storing copies of corresponding virtual pages, wherein I/O mechanisms are employed for effectuating transfer of data between auxiliary and real storage, a system and method for managing storage of unvirtualized dataset pages destined for auxiliary storage in a manner so to avoid I/O operations when assigning or moving VIO dataset data. The system and method is used to allow faster access to VIO data set pages by allowing that data to be kept in real storage.

21 Claims, 3 Drawing Sheets

MANAGING UNVIRTUALIZED DATA PAGES IN REAL STORAGE

BACKGROUND OF THE INVENTION

1. Field of the Invention

This invention relates generally to virtual memory storage systems for mini and mainframe computing systems, and particularly, to a novel system for managing storage of unvirtualized data pages in real storage.

2. Discussion of the Prior Art

Virtual memory management schemes enable a computer system to present a large address space, larger than the amount of real storage on the system. A virtual memory management scheme consists of a mapping of an address space which provide a means of translating a virtual address of a page into a real address of a frame. A frame is the basic unit by which real storage is managed in a computer system. For example, in z/Architecture a frame consists of 4096 bytes.

Since real storage is a limited resource, when the operating system determines that it has become scarce it may try to write the data on some real frames to auxiliary storage, also called a direct access storage device (DASD) which is cheaper and more plentiful, but much slower to access. This operation is known as paging and involves initiating output device I/O to auxiliary storage. The operating system makes paging decisions at a global level and a local level. At the global level, the operating system determines which address spaces will suffer a potential performance penalty of having their data paged out to auxiliary storage. At the local level, the operating system determines which frames within an address space are good candidates to be paged to auxiliary storage. In general, frames which are least recently used are better candidates to be paged to auxiliary storage since they have a lower likelihood of being referenced in the near future. Computer systems, including z/Architecture, provide facilities to approximate least recently used (LRU) order. Part of the facility is the Referenced bit which is associated with each frame of storage in z/Architecture. The Referenced bit is turned on by the hardware whenever a frame of storage is referenced or changed. A separate bit called the Changed bit is turned on by the hardware whenever a frame is changed. z/Architecture also provides an instruction called Reset Reference Bit Extended (herein referred to a RRBE) which sets the Referenced bit to zero and sets a condition code which provides an indication of whether the frame was changed and/or referenced. The OS/390 operating system maintains a data structure, known as the Page Frame Table Entry (or PFTE) which includes data corresponding to a single frame. The aggregate of PFTEs is referred to as the PFT or Page Frame Table. PFTEs corresponding to frames used for a particular address space are placed on a queue. Periodically, this queue of PFTEs is traversed and the RRBE instruction is used to determine whether the frame is referenced; PFTEs corresponding to frames that have been referenced are moved to the back of the queue. This traversal of the PFTE queue is known as Unreferenced Interval Count Update (or UIC Update).

The act of writing real frames in use by an address space to auxiliary storage to replenish the number of available frames is referred to as stealing. When an address space is selected for stealing, steal candidates are selected by traversing the PFTE queue from the front to the back, in least recently used (LRU) order.

To support paging input/output (I/O) to/from auxiliary storage, virtual storage memory systems implement a facility known as Virtual Input/Output (VIO), which enables system-managed, temporary datasets to reside on virtual devices in external page storage. VIO is designed to reduce the need for the processor to transfer data between DASD and a real storage device and be processed using paging I/O. In operation, VIO's implement a scheme that partitions a dataset in 4K-byte pages, for example. By implementing VIO, system performance is improved as much of the overhead and time required to allocate a device and to move data physically between main storage and an I/O device is eliminated. As known, VIO is supported by services provided by: 1) an Auxiliary Storage Manager (ASM) which dynamically allocates page-size physical blocks to the VIO dataset, treats each VIO dataset as a logical group (LG) of 4096-byte pages and assigns each dataset page within a logical group an identifier known as a Logical Page Identifier (LPID); and, 2) a Real Storage Manager (RSM) which manipulates page table entries (PTE), external page table entries (XPTE), and page frame table entries (PFTE), and in response to requests made to connect (input) or disconnect (output) VIO dataset pages to or from a VIO buffer which is used by VIO to simulate I/O, by moving data between the VIO buffer and the user's buffer. The LPID is an 8 byte long word comprised of a first 4 byte word LGID (Logical Group ID) assigned by ASM to a Vio Dataset and, a second 4 byte word RPN (Relative Page Number) which is assigned by a Virtual block processor (VBP) to each page of the VIO Dataset.

As known, the following RSM requests are supported: ASSIGN which is an operation for generally assigning a Vio Dataset Page to virtual storage (hereinafter, a "Vio Window Page") includes the following variations: an ASSIGN NULL which is a process requested by the VIO facility when a virtual page is required and which assigns the Vio Window Page first reference data (e.g., a page of zeroes); and, ASSIGN NORMAL which is an operation for connecting a VIO dataset page to the VIO buffer, i.e., a Vio Window page 20 gets its data from the Vio dataset page 25, as shown in FIG. 1; MOVE-OUT-NULL (Disconnect) a process for disconnecting the pages in the VIO buffer from virtual storage, i.e., the Vio Window Page is made first reference and the association between the Vio Window Page and the Vio Dataset Page no longer exists; MOVE-OUT (Non-Disconnect) a process for copying the data from the Vio Window Page to the Vio Dataset Page and putting the Vio Dataset Page on Auxiliary storage. The association between the Vio Window Page and the Vio Dataset Page remains intact; MOVE-OUT (Disconnect) is a process for causing a page-out to occur unless the page was stolen, i.e., data is copied from the Vio Window Page to the Vio Dataset Page. The Vio Window Page is made first reference and the association between the Vio Window Page and the Vio Dataset Page no longer exists.

Certain data such as dataset data that reside in external paging storage is known as "unvirtualized" and in virtual storage memory systems such as the IBM OS/390, requires I/O operations to access this data.

It would be highly desirable to provide a virtual memory storage system with the ability to keep such unvirtualized data, i.e., VIO datasets, in real storage in order to help reduce the I/O needed to reference this data.

SUMMARY OF THE INVENTION

It is thus an object of the present invention to provide a virtual memory storage system with the ability to keep unvirtualized data in real storage in order to help reduce the I/O needed in order to reference this data.

When data needs to be written out to a dataset residing in external paging space, no output I/O needs to be performed if the dataset data is kept in real storage. All that is necessary is a copy operation for copying the data from the real frame for the window page to a real frame that represents the dataset page. Additionally, when there is need to retrieve the dataset data into a virtual window, if the dataset page resides in real then there is no need for input I/O. Copying the data from the frame containing the dataset page to the frame that backs the virtual window is all that is needed.

According to the principles of the invention, there is provided in a computing system implementing a virtual memory system having real memory storage frames for storing virtual pages of data and an auxiliary storage system comprising auxiliary storage slots for storing copies of corresponding virtual pages, wherein I/O mechanisms are employed for effectuating transfer of data between the auxiliary and real storage, a system and method for managing storage of unvirtualized dataset pages destined for auxiliary storage, the method comprising the steps of: moving data from a virtual window in an address space to a virtual input/output (VIO) dataset allocated for storage in a frame in real memory; maintaining a pageable frame queue associated with the address space that owns the VIO dataset; generating a page frame associated with the VIO dataset page and queuing the page frame to the pageable frame queue; and, indicating the frame as including unvirtualized data and one of: marking the page frame for the VIO dataset page as unchanged if there is another copy of the VIO dataset page resides on the Auxiliary storage, or marking the frame as changed if the VIO dataset page is the only copy of the VIO dataset page, whereby the unvirtualized data is efficiently accessible without having to employ I/O mechanisms.

Advantageously, the system and method of the invention may be used to allow faster access to VIO data set data by allowing that data to be kept in real storage. Thus, when the system is not constrained for real storage VIO dataset pages that are to be written out to the external paging space are kept in real storage.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENTS

This data management system of the invention enables unvirtualized data (such us dataset data that reside in external paging storage) to be kept in real storage. The ability to keep unvirtualized data in real storage allows for faster access to this data, by avoiding the need for I/O. When this data needs to be brought into a virtual storage window for processing, the data is copied from the real storage frame that represents the dataset page into the corresponding frame that backs the virtual window page. The real storage frames that represent unvirtualized data can be stolen according to the frame replacement algorithm implemented by the operating system just like frames that back virtual pages. Additionally, these frames are eligible to be swapped if they are part of the working set of the address space that owns the dataset that these frames represent.

Figure 1:
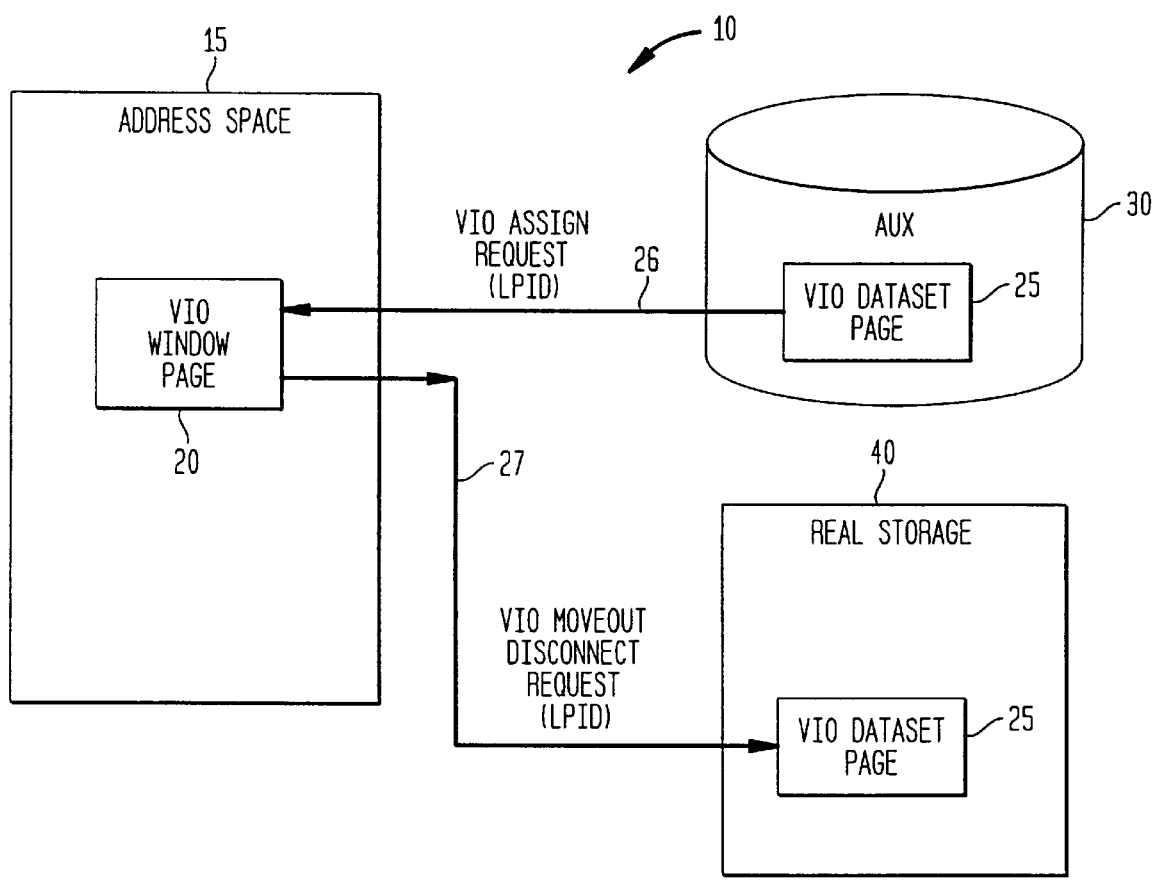
FIG. 1 is a block diagram depicting the operations 10 for moving VIO dataset data into real storage.

With reference to FIG. 1, the operations 10 for moving VIO dataset data into real storage are now described. It should be understood that, when the OS/390 system is not constrained for real storage, VIO dataset pages that are to be written out to the external paging space may now be kept in real storage. That is, the Vio Dataset Page 25 may reside in Real storage or Auxiliary storage as directed by a system resource manager (SRM). Particularly, as shown in FIG. 1, a Vio Dataset Page 25 is located on AUX storage 30. An ASSIGN request 26 with the preload option is then issued and, in response, I/O is performed to get the data from the Vio Dataset Page on AUX to the Vio Window Page 20 residing in address space 15. It is understood that data in the Vio Window page 20 is only referenced. Then, a MOVEOUT Disconnect request 27 is issued. According to the invention, the SRM (not shown) directs that the Vio Dataset Page should go to Real storage 40. The ASM (not shown) is queried for the current location of the Vio Dataset Page 25 and ASM returns a LSID indicating that the VIO Dataset Page is on AUX storage 30. A frame is then obtained for the Vio Dataset Page and the window data from the Vio Window is copied to the Vio Dataset Page 25' now in Real storage 40. Accordingly, as will be described with reference to FIG. 2, a Page Frame Table Entry 50 is initialized for the Vio dataset page. It is understood that PFTE's are created for each dataset page existing in Real storage. Additionally, the frame in real storage 40 that represents the Vio dataset page 25' is marked as follows: Changed—if there does not exist another copy of the Vio Dataset Page (PFTALSID=0) on external paging space, or Unchanged—if there is exists another copy of the Vio Dataset Page on AUX (PFTALSID is non-zero). Afterwards, the PFTE is then queued on the pageable frame queue (PFQ) of the address space that owns the Vio dataset. The page frame table entry (PFTE) for the frame that represents the VIO dataset page is initialized to indicate that this is a frame that includes unvirtualized data. In the example depicted in FIG. 1, the frame 25' is NOT marked changed since there exists a copy of the data on AUX storage 30.

Figure 2:
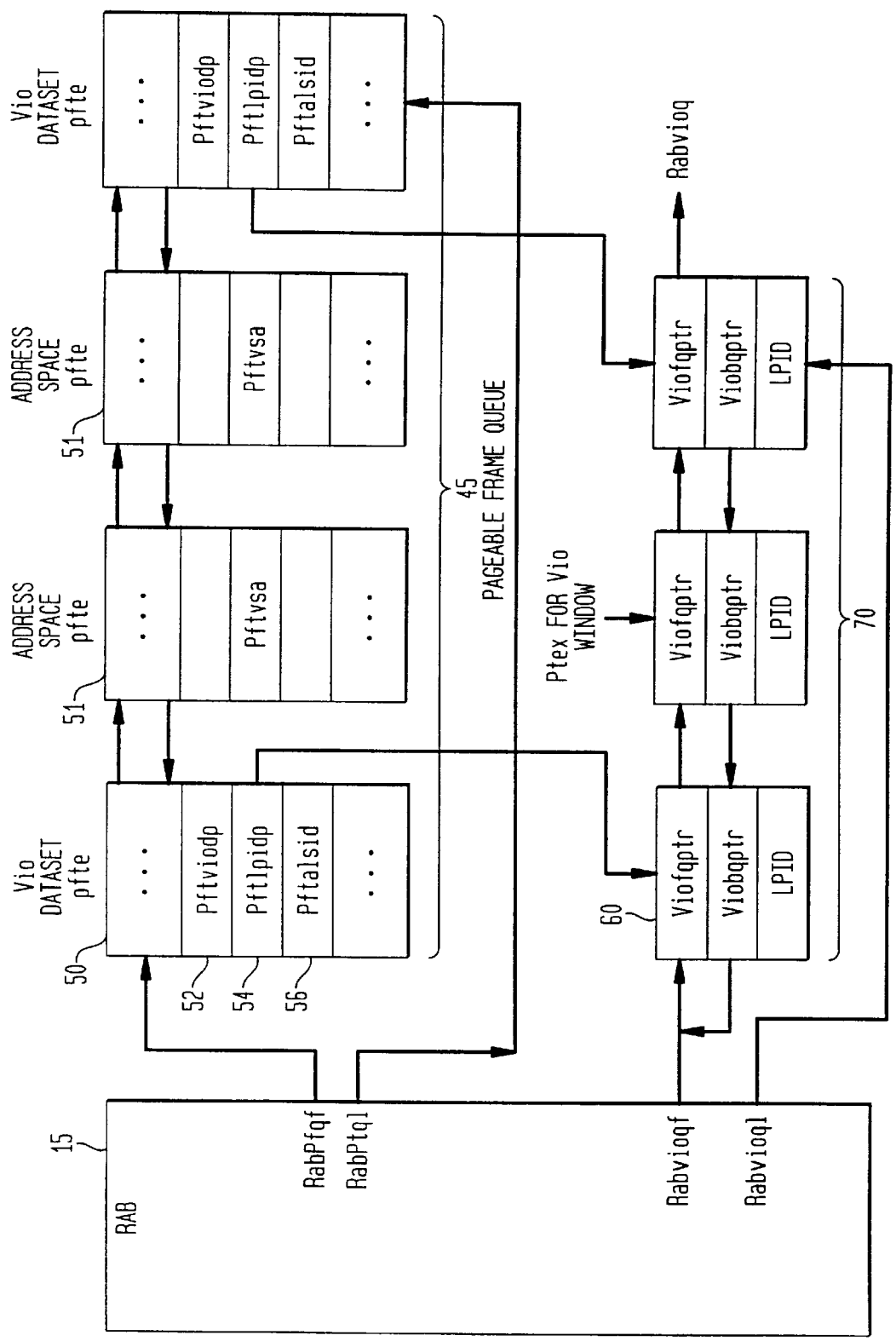
FIG. 2 depicts conceptually the Pageable Frame Queue (PFQ) 45 for the address space 15 that now owns the Vio dataset in Real storage.

FIG. 2 depicts conceptually the Pageable Frame Queue (PFQ) 45 for the address space 15 that now owns the Vio dataset in Real storage. As shown in FIG. 2, the PFQ 45 now includes a PFTE entry 50 corresponding to the Vio dataset 25'. According to the invention, enhancements are made to the PFTE 50 such that these frames may be distinguished from normal PFTE frames 51 that back virtual data and processed accordingly by functions such as steal and swap. These enhancements include initializing the PFTE entry 50 to include the following fields: a Pftviodp field 52 which indicates that this data is a Vio Dataset PFTE; a Pftlpidp field 54 which is a pointer for pointing to the LPID Block 60 for the Vio Dataset Page; and, a Pftalsid field 56 which is the logical slot identification (LSID) for the auxiliary storage copy of the Vio Dataset Page 25. If no auxiliary storage copy exists, the Pftalsid field 56 is set to zero.

As further shown in FIG. 2, LPID is stored in a Vio LPID Block 60 which is queued on a double threaded LPID Block queue 70 anchored in the RSM Address Space Block (RAB) 15 viofqptr/viobqptr are respective forward and back pointers for referencing other blocks 60 in the LPID Block queue 70. Further, besides being pointed from the PFTE 50 for a Vio dataset page, it is understood that the LPID Block 60 may still be pointed to by the external page table entry (PTEX) (not shown) for a Vio Window Page for the case when the Window Page contains the same data as the VIO dataset page, i.e., the data in the window has not changed since it was loaded from the VIO dataset page. Vio LPID block is obtained when the following occur: on an ASSIGN request when an LPID block is needed for a Vio Window Page; and, for a MOVEOUT disconnect request when an LPID block is needed for a Vio Dataset Page that resides in Real storage.

As unvirtualized data is now represented by a frame on a frame queue according to the invention, ASM and RSM are influenced as follows:

RSM is affected in the manner that any operation that implements processing of the PFQ of an address space requires that Vio dataset PFTEs are treated differently from the PFTEs that back virtual data. The following functions are also heavily affected: Vio Processing, Page Fault, Page Load, Steal (UIC, Pref, Misc.), Swap and Recovery.

Figure 3:
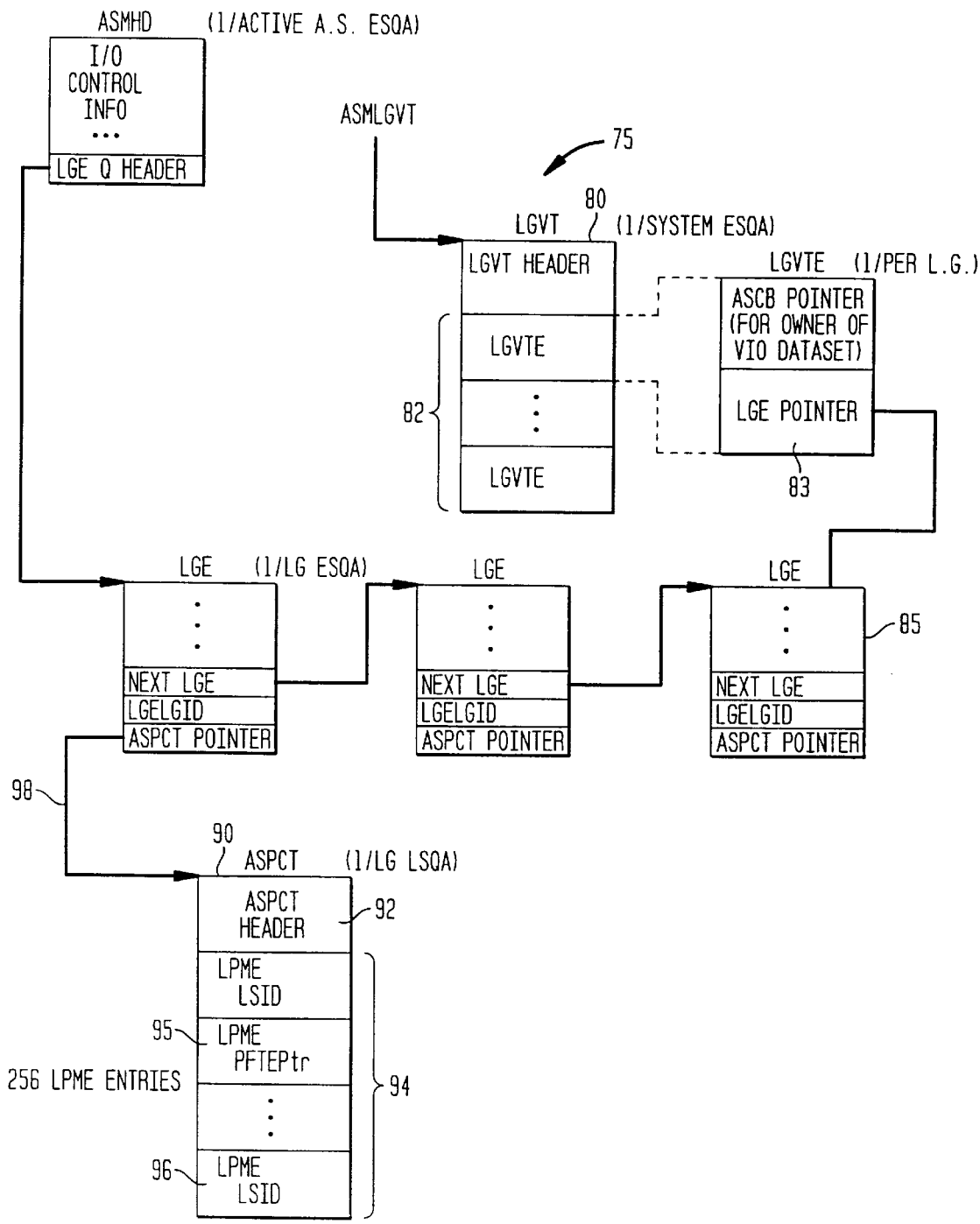
FIG. 3 is a schematic diagram an ASM control sub-system 75 in the IBM OS/390 system.

The ASM is able to keep track of the current location of the VIO dataset page by keeping a table indexed by the Logical Page ID for the VIO dataset page. More specifically, as shown in FIG. 3, in the IBM OS/390 system architecture, the ASM control sub-system 75 includes one Logical Group Vector Table (LGVT) 80 that is created during ASM initialization time. When it is created at initialization time 125 LGVTE entries 82 are allocated (e.g., the 124 entries are used, the first header entry is not used), with each entry including a pointer 83 to a Logical Group Entry (LGE) table 85. When the ASM is called to get a LGID during a VIO dataset open time, the LGVT is expanded if all the 124 entries initially allocated are used. Expansion of the LGVT involves obtaining enough storage for the size of the current LGVT plus 128 extra LGVT entries. The old LGVT is copied into the new storage and the old storage is freed. At LGID assign time the LGVTE for the VIO dataset is also initialized. It is understood that the LGID serves as an index into the appropriate LGVTE entry.

A Logical Group Entry (LGE) 85 is further provided per Logical Group (VIO dataset). Storage is obtained for the LGE and the LGE is initialized when VBP calls ASM to assign a LGID for the VIO dataset. An ASM Page Correspondence Table (ASPCT) 90 is further provided per Logical Group (VIO dataset). Storage is obtained for the ASPCT which includes 256 Logical Page Map Entry (LPME) entries 94 during LGID assign time. The ASPCT header 92 is also initialized at this time. If more LPME entries are needed, than the initial 256 the ASPCT expansion happens when RSM calls ASM to inform ASM of the new location of the VIO Dataset page. The LPME 92 includes the location of the VIO Dataset Page. If the location of the VIO Dataset Page is in a real storage frame, then the LPME, e.g., LPME entry 95, includes a pointer to the PFTE for the VIO Dataset Page. If the VIO Dataset Page is on AUX, then the LPME, e.g., LPME entry 96, includes the Logical Slot ID (LSID) for the VIO Dataset Page. It should be understood that the RPN 98 serves as an index into the appropriate LPME entry. Every time the Real Storage Manager transfers the VIO dataset page either to Aux storage or another frame in Real storage (FIG. 1), ASM is informed of the new location of the VIO dataset page.

If the system needs to steal the VIO dataset frame, then if the PFTE contains an alternate LSID the ASM is called indicating that the VIO dataset page now resides on AUX storage as indicated by the alternate LSID, and no I/O is needed. If there is no alternate LSID in the PFTE 50 for the VIO dataset page then output I/O is performed and ASM is informed of the new location of the VIO dataset page.

When the VIO dataset page occupies a real storage frame that is now needed by the system for use by other functions (such as when the VIO dataset page occupies a frame that needs to be taken offline by the system), a VIO dataset frame may be exchanged with a new frame in real, in this case, the ASM is called in order to record the new location in real storage for the VIO dataset data. That is, a VIO dataset page is exchanged with another frame in real, when the VIO dataset page occupies a type of frame that the system needs. In this case, the system exchanges the VIO dataset page with another type of frame of which the system has plenty and takes the old VIO dataset page frame and frees it up for system use. In the example when the system is taking a particular range of real storage frames offline and the VIO dataset page happens to occupy one of these frames, the system exchanges the VIO dataset page frame with another frame in the system that is not being taken offline and returns the old VIO dataset page frame to the system so it may be taken offline. When a Vio dataset page frame is exchanged with another frame, the Vio dataset page data is copied to the new frame, and ASM is informed of the new location in real storage for the VIO dataset data (ASM updates the PFTE pointer in its tables to now point to the new frame for the Vio dataset page).

The same approach is used for the page load function for VIO window pages. During swap out of an address space VIO dataset pages may be swapped along with the working set for that address space. During swap in, ASM is called for VIO dataset pages so the new location in Real storage for the VIO data may be recorded.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. In a computing system implementing a virtual memory system having real memory storage frames for storing virtual pages of data and an auxiliary storage system comprising auxiliary storage slots for storing copies of corresponding virtual pages, wherein I/O mechanisms are employed for effectuating transfer of data between said auxiliary and real storage, a method for managing storage of unvirtualized dataset pages destined for auxiliary storage, said method comprising the steps of:

a) moving data from a virtual window in an address space to a virtual input/output (VIO) dataset allocated for storage in a frame in real memory, b) maintaining a pageable frame queue associated with the address space that owns the VIO dataset;

c) generating a page frame table entry associated with said VIO dataset page and queuing said page frame table entry to said pageable frame queue; and, d) indicating said frame as including unvirtualized data and one of: marking said page frame table entry for the VIO dataset page as unchanged if there is another copy of the VIO dataset page resides on said auxiliary storage, or marking said frame as changed if the VIO dataset page in said real memory is the only copy, whereby said unvirtualized data is efficiently accessible without employing said I/O mechanisms.

2. The method for managing storage of unvirtualized dataset pages as claimed in claim 1, wherein said dataset is to be kept in said real storage, the moving step comprising copying said dataset to a frame in real storage.

3. The method for managing storage of unvirtualized dataset pages as claimed in claim 2, further including the step of retrieving data for input to a virtual storage window for processing, said retrieving step including copying data from said real storage frame that represents the VIO dataset page into the corresponding frame that backs the virtual window page.

4. The method for managing storage of unvirtualized dataset pages as claimed in claim 2, wherein said page frame table entry includes an entry comprising a logical page identifier (LPID) that represents a particular VIO dataset.

5. The method for managing storage of unvirtualized dataset pages as claimed in claim 2, wherein said page frame table entry includes a logical slot identifier that represents a particular VIO dataset that exists in auxiliary storage.

6. The method for managing storage of unvirtualized dataset pages as claimed in claim 4, further comprising the step of tracking current locations of VIO dataset pages by maintaining a table indexable by a LPID for the VIO dataset page.

7. The method for managing storage of unvirtualized dataset pages as claimed in claim 6, further comprising the step of exchanging contents of a VIO dataset frame with a new frame in said real storage when the VIO dataset page occupies a type of frame that the system needs, whereby the new location in real storage for the VIO dataset data is recorded in said indexable table.

8. A program storage device readable by machine, tangibly embodying a program of instructions executable by the machine to perform method steps for managing storage of unvirtualized dataset pages destined for auxiliary storage in a computing system implementing a virtual memory system having real memory storage frames for storing virtual pages of data and an auxiliary storage system comprising auxiliary storage slots for storing copies of corresponding virtual pages, wherein I/O mechanisms are employed for effectuating transfer of data between said auxiliary and real storage, the method steps comprising:

a) moving data from a virtual window in an address space to a virtual input/output (VIO) dataset allocated for storage in a frame in real memory,
   b) maintaining a pageable frame queue associated with the address space that owns the VIO dataset;
   c) generating a page frame table entry associated with said VIO dataset page and queuing said page frame table entry to said pageable frame queue; and,
   d) indicating said frame as including unvirtualized data and one of: marking said page frame table entry for the VIO dataset page as unchanged if there is another copy of the VIO dataset page resides on said auxiliary storage, or marking said page frame table entry as changed if the VIO dataset page in said real memory is the only copy, whereby said unvirtualized data is efficiently accessible without employing said I/O mechanisms.

9. The program storage device readable by machine as claimed in claim 8, wherein said dataset is to be kept in said real storage, the moving step comprising copying said dataset to a frame in real storage.

10. The program storage device readable by machine as claimed in claim 9, further including the step of retrieving data for input to a virtual storage window for processing, said retrieving step including copying data from said real storage frame that represents the VIO dataset page into the corresponding frame that backs the virtual window page.

11. The program storage device readable by machine as claimed in claim 9, wherein said page frame table entry includes a logical page identifier (LPID) that represents a particular VIO dataset.

12. The program storage device readable by machine as claimed in claim 9, wherein said page frame table entry includes a logical slot identifier that represents a particular VIO dataset that exists in auxiliary storage.

13. The program storage device readable by machine as claimed in claim 11, further comprising the step of tracking current locations of VIO dataset pages by maintaining a table indexable by a LPID for the VIO dataset page.

14. The program storage device readable by machine as claimed in claim 13, further comprising the step of exchanging contents of a VIO dataset frame with a new frame in said real storage when the VIO dataset page occupies a type of frame that the system needs, whereby the new location in real storage for the VIO dataset data is recorded in said indexable table.

15. A system for managing storage of unvirtualized dataset pages destined for auxiliary storage in a computing system implementing a virtual memory system having real memory storage frames for storing virtual pages of data and an auxiliary storage system comprising auxiliary storage slots for storing copies of corresponding virtual pages, whereby I/O mechanisms are employed for effectuating transfer of data between said auxiliary and real storage, said system comprising:

a) an address space including a virtual window for receiving data representing a virtual input/output (VIO) dataset page allocated for storage in a frame in real memory,
   b) mechanism for generating a page frame associated with said VIO dataset page, said frame for the VIO dataset page representing unvirtualized data and including indication as being unchanged if there is another copy of the VIO dataset page residing on said auxiliary storage, or indicating said frame as changed if the VIO dataset page in said real memory is the only copy; and
   c) a pageable frame queue associated with the address space that owns the VIO dataset data, said pageable frame queue for queuing said page frame, whereby said unvirtualized data is efficiently accessible in said real storage without the need for employing said I/O mechanisms.

16. The system for managing storage of unvirtualized dataset pages as claimed in claim 15, further including mechanism for copying said VIO dataset data to a frame in real storage.

17. The system for managing storage of unvirtualized dataset pages as claimed in claim 16, wherein said copying mechanism further copies data from a real storage frame that represents the VIO dataset page into the corresponding frame that backs the virtual window page so that data for input to a virtual storage window is available for processing.

18. The system for managing storage of unvirtualized dataset pages as claimed in claim 16, wherein said page frame table entry includes a logical page identifier (LPID) that represents a particular VIO dataset.

19. The method for managing storage of unvirtualized dataset pages as claimed in claim 16, wherein said page frame table entry includes a logical slot identifier that represents a particular VIO dataset that exists in auxiliary storage.

20. The system for managing storage of unvirtualized dataset pages as claimed in claim 18, further comprising mechanism for tracking current locations of VIO dataset pages by maintaining a table indexable by a LPID for the VIO dataset page.

21. The system for managing storage of unvirtualized dataset pages as claimed in claim 20, further comprising a mechanism for exchanging contents of a VIO dataset frame with a new frame in said real storage when the VIO dataset page occupies a type of frame that the computing system needs, and recording the new location in real storage for the VIO dataset data in said indexable table.

* * * * *